US006706809B2

(12) United States Patent
Tutin et al.

(10) Patent No.: US 6,706,809 B2
(45) Date of Patent: Mar. 16, 2004

(54) RESIN/BINDER SYSTEM FOR PREPARATION OF LOW ODOR FIBERGLASS PRODUCTS

(75) Inventors: Kim Tutin, Stone Mountain, GA (US); W. Hayes Ingram, Conyers, GA (US); Mary L. Epling, Conyers, GA (US); Kurt D. Gabrielson, Lilburn, GA (US); James T. Wright, Lithonia, GA (US); Carl R. White, Conyers, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 15 days.

(21) Appl. No.: 09/989,708

(22) Filed: Nov. 21, 2001

(65) Prior Publication Data

US 2003/0096922 A1 May 22, 2003

(51) Int. Cl.[7] .................................................. C08L 61/34
(52) U.S. Cl. ........................ 524/595; 524/541; 524/596; 525/495; 528/162; 528/163; 528/164
(58) Field of Search .......................... 525/495; 528/162, 528/163, 164; 524/595, 596, 541

(56) References Cited

U.S. PATENT DOCUMENTS

| | | |
|---|---|---|
| 3,223,668 A | 12/1965 | Stalego |
| 3,444,119 A * | 5/1969 | Blanc .......................... 524/595 |
| 3,616,179 A | 10/1971 | McCombs et al. |
| 3,617,428 A | 11/1971 | Carlson |
| 3,819,441 A | 6/1974 | Fargo et al. |
| 3,935,139 A | 1/1976 | Ashall |
| 3,956,204 A | 5/1976 | Higginbottom |
| 3,956,205 A | 5/1976 | Higginbottom |
| 4,028,367 A | 6/1977 | Higginbottom |
| 4,060,504 A | 11/1977 | Higginbottom |
| 4,095,010 A | 6/1978 | Zellar et al. |
| 4,176,105 A | 11/1979 | Miedaner |
| 4,373,062 A | 2/1983 | Brown |
| 4,376,807 A | 3/1983 | Cannon et al. |
| 4,525,492 A | 6/1985 | Rastall et al. |
| 4,757,108 A | 7/1988 | Walisser |
| 4,960,826 A | 10/1990 | Walisser |
| 5,011,886 A | 4/1991 | Buschfeld et al. |
| 5,296,584 A | 3/1994 | Walisser |
| 5,324,337 A | 6/1994 | Heilbing |
| 5,358,748 A | 10/1994 | Mathews et al. |
| 5,368,803 A | 11/1994 | Brow et al. |
| 5,371,140 A | 12/1994 | Parks |
| 5,505,998 A | 4/1996 | Mathews et al. |
| 5,534,612 A | 7/1996 | Taylor et al. |
| 5,538,761 A | 7/1996 | Taylor |
| 5,578,371 A | 11/1996 | Taylor et al. |
| 5,612,405 A | 3/1997 | Bainbridge et al. |
| 5,623,032 A | 4/1997 | Wu |
| 5,684,118 A | 11/1997 | Breyer et al. |
| 5,708,121 A | 1/1998 | Parks et al. |
| 5,719,228 A | 2/1998 | Taylor et al. |
| 5,795,934 A | 8/1998 | Parks |
| 5,864,003 A | 1/1999 | Qureshi et al. |
| 5,952,440 A | 9/1999 | Walisser et al. |
| 6,077,883 A | 6/2000 | Taylor et al. |
| 6,090,883 A | 7/2000 | Fouquay et al. |
| 6,114,491 A | 9/2000 | Dupre et al. |
| 6,194,512 B1 | 2/2001 | Chen et al. |

FOREIGN PATENT DOCUMENTS

WO    WO 94/18187 A1    7/1994

* cited by examiner

Primary Examiner—Patricia A. Short
(74) Attorney, Agent, or Firm—Banner & Witcoff, Ltd.

(57) ABSTRACT

Infinitely water soluble, storage stable, low molecular weight, amine-modified resins/binders (e.g., phenol-formaldehyde resole resins and binders made therefrom) are used to produce low odor fiberglass products, such as fiberglass insulation for automobile headliners and room dividers. The cured, bonded fiberglass products have low TMA (trimethylamine) emission because the free formaldehyde in the resin has been scavenged with melamine, which resists thermal decomposition, and because the binder contains a relatively low urea content, which is a TMA contributor. The resole resin production process includes adding two different formaldehyde scavengers (e.g., melamine and urea) to produce a modified phenol-formaldehyde resole resin. This resole resin is produced into a binder by mixing with water, optionally in the presence of a latent acid catalyst (e.g., an ammonium salt of a strong acid). The binder can be applied to a fiberglass base material, dried, stored for an extended time period, and then cured and shaped into a final desired shape.

49 Claims, No Drawings

RESIN/BINDER SYSTEM FOR PREPARATION OF LOW ODOR FIBERGLASS PRODUCTS

FIELD OF THE INVENTION

The present invention relates to water soluble, storage stable, low molecular weight, amine-modified resins/binders (e.g., phenol-formaldehyde resole resins and binders made therefrom) used in the production of fiberglass products, as well as to methods for making the modified resins, binders, and fiberglass products. These products and methods are particularly useful in making low odor fiberglass products useful for insulation, including, but not limited to, insulation used in automobile headliners and room dividers. Cured, bonded fiberglass products produced using the binders according to this invention have low odor emissions because the binders have low free formaldehyde content and the cured products release very low levels of trimethylamine (TMA).

BACKGROUND OF THE INVENTION

Use of fiberglass to produce insulation products, such as automobile headliners and room dividers, is known. In general, a binder is prepared from a phenol-formaldehyde resin, and this binder is applied to a fiberglass base material. The base material can later be shaped, sized as desired, and cured to maintain the base material in this final, desired shape.

Many patents and other literature describe general fiberglass production processes. U.S. Pat. No. 5,952,440 contains a detailed description of the history and the state of the art relating to this type of fiberglass technology. This patent is entirely incorporated herein by reference.

In general, phenol-formaldehyde resole resins have been used in preparing binders for fiberglass insulation products. These resins have a disadvantage, however, in that they contain a large amount of free formaldehyde, which has a distinctive and unpleasant odor. To combat this problem, fiberglass producers have generally taken two approaches. First, they allow the phenol-formaldehyde resole resin reaction procedure to proceed until there is a very low free formaldehyde content in the product, which helps reduce the formaldehyde emissions and the resulting odor. Second, they add a formaldehyde scavenger to the binder, to tie up the free formaldehyde and thereby limit its subsequent emission and odor.

U.S. Pat. No. 5,952,440 describes a system that attempts to take advantage of both of these possible "cures." Specifically, when producing the resole resin in the system described in U.S. Pat. No. 5,952,440, the phenol-formaldehyde reaction is allowed to proceed until the free formaldehyde content in the resin is in the range of 0.5% to 2.5%, by weight (based on a total weight of the resin), and preferably between 0.7 and 2% by weight, and most advantageously between 0.8 and 1.2% by weight. Then, melamine is added to the resin to react with the remaining free formaldehyde (melamine acts as a formaldehyde "scavenger").

These "cures," however, are not without their own associated drawbacks and disadvantages. For example, allowing the resole resin to react for a sufficient time to reach a very low free formaldehyde content will result in a resin product having a higher molecular weight (the resin is said to be more "advanced"). High molecular weight phenol-formaldehyde resole resins tend to be sticky, which causes the binder and the binder-coated fiberglass product to stick to the production equipment, particularly in the fiberglass forming chamber. Additionally, higher molecular weight phenol-formaldehyde resole resins tend to have a higher tetradimer content. "Tetradimer" is a phenol-formaldehyde dimer present in all phenolic resoles. This dimer is very crystalline and precipitates readily, especially when the free formaldehyde of the resin has been scavenged, for example, by melamine or urea. Tetradimer precipitation has long been recognized in the industry as a problem that can result, for example, in plugged spray nozzles and in precipitate formation in the resin, premix, and binder storage tanks. This precipitate must be removed and discarded, which increases production expenses and decreases binder efficiency.

Use of a large amount of melamine as a formaldehyde scavenger, as described in U.S. Pat. No. 5,952,440, however, also can lead to precipitation problems. U.S. Pat. No. 5,952,440 describes use of melamine such that the molar ratio of free formaldehyde to melamine is 0.5 to 1.5. Melamine is known to have limited water solubility. Therefore, it may be necessary to filter out excess, undissolved melamine, as described in U.S. Pat. No. 5,952,440. This is an expensive and time-consuming additional step. Moreover, when used as a formaldehyde scavenger, melamine reacts with formaldehyde to form methylolated melamine species, which have been shown to be unstable. This methylolated melamine can form an undesirable white precipitate when the resin is allowed to age. Also, melamine is fairly expensive, which increases the cost of the resulting fiberglass products.

The use of melamine, however, has certain advantages over use of urea, another commonly used formaldehyde scavenger. While urea is less expensive than melamine, it also is less thermally stable. Thermal stability is important because when the scavengers react with formaldehyde, a formaldehyde-amine species is formed. When this species breaks down, trimethylamine (TMA) is produced in the finished fiberglass product. TMA also has a distinctive and unpleasant odor (a "fishy" odor), and therefore its formation should be avoided in fiberglass products. U.S. Pat. No. 5,952,440 also advocates against use of urea in the binder system to avoid rapid solidification of the binder before it adequately spreads over the glass fibers during fiber production.

U.S. Pat. No. 3,819,441 describes a process for making glass fiber products using phenolic binder resins that are condensed to an advanced stage such that the condensate is water-insoluble at a pH of 7.5. The condensate is solubilized by adding a small amount of a non-ionic or anionic agent (such as coconut fatty acid amine). During production of the binder in the process described in this patent, melamine and a large relative amount of urea are added to the binder mixture. This patent is entirely incorporated herein by reference. Because of its relatively high urea content, it is expected that this material would produce a significantly unpleasant odor.

Several U.S. patents describe use of an acidic binder to produce a low odor/low TMA emission fiberglass product. See, for example, U.S. Pat. Nos. 5,296,584, 5,358,748, 5,368,803, and 5,505,998, which patents are entirely incorporated herein by reference. Such acidic binders, however, are very corrosive. Fiberglass plants that use such binders must have stainless steel equipment at any place that has direct contact with the binder. Stainless steel has not traditionally been used in fiberglass plants. Therefore, use of these patented systems may require that the plants "retrofit" with stainless steel, at considerable cost in both money and down time. Additionally, acidic binders are relatively unstable and tend to lose their water dilutability rather quickly. This can produce precipitates in the binder material and require that the binder be filtered and/or discarded.

Other known resin/binder systems are emulsifiable rather than water soluble. Emulsifiable systems, however, are more difficult for fiberglass manufacturers to handle because if the emulsion breaks, high molecular weight resin will coat the equipment. Additionally, emulsifiable resins and binders typically have a higher molecular weight. Therefore, even if the emulsions remain stable and do not break, sticking problems can result, as generally described above.

The present invention has been developed to address various disadvantages and problems known in this art. This invention relates to water soluble, storage stable, low molecular weight, amine-modified resins/binders (e.g., phenol-formaldehyde resole resins and binders made therefrom) used in the production of fiberglass products, as well as to methods for making the modified resins, binders, and fiberglass products. These resin/binder products and methods are particularly useful in making low odor fiberglass products.

SUMMARY OF THE INVENTION

The present invention relates to methods for making modified phenol-formaldehyde resole resins. In one embodiment, this method includes: (a) combining phenol, formaldehyde, water, and a base catalyst to form a mixture; (b) reacting the mixture to produce a reaction mixture containing at least a phenol-formaldehyde reaction product and free formaldehyde, wherein the reaction mixture contains more than 2.5% free formaldehyde by weight, based on a total weight of the reaction mixture; (c) combining a first formaldehyde scavenger and the reaction mixture, wherein the first formaldehyde scavenger includes a member selected from the group consisting of melamine, urea, dicyandiamide, guanidine, and ammonium hydroxide, and wherein a total amount of the first formaldehyde scavenger and the reaction mixture are combined such that a molar ratio of the free formaldehyde in the reaction mixture to the total amount of the first formaldehyde scavenger is in a range of 0.1 to 30 (and preferably in the range of 3 to 30); (d) combining a second formaldehyde scavenger and the reaction mixture, wherein the second formaldehyde scavenger is different from the first formaldehyde scavenger and includes a member selected from the group consisting of melamine, urea, dicyandiamide, guanidine, and ammonium hydroxide, wherein a total amount of the second formaldehyde scavenger and the reaction mixture are combined such that a molar ratio of the total amount of the first formaldehyde scavenger to the total amount of the second formaldehyde scavenger is in a range of 0.075 to 13.5, and wherein a molar ratio of the free formaldehyde in the reaction mixture to the total amount of the second formaldehyde scavenger is in a range of 0.1 to 20 (and preferably in the range of 2 to 20); and (e) reacting the reaction mixture, the first formaldehyde scavenger, and the second formaldehyde scavenger to form a modified phenol-formaldehyde resole resin, wherein the first and second formaldehyde scavengers react with at least some of the free formaldehyde in the reaction mixture, and wherein the resulting modified phenol-formaldehyde resole resin has a free formaldehyde content of less than 3% by weight, based on a total weight of the modified phenol-formaldehyde resole resin. Advantageously, the method according to this embodiment of the invention can be used to produce a modified phenol-formaldehyde resole resin having a free formaldehyde content of less than 2% by weight, less than 1.5% by weight, or even less than 1.2% or 1% by weight, based on the total weight of the modified phenol-formaldehyde resole resin. The modified phenol-formaldehyde resole resin products produced by this method also form a part of this invention.

Additionally, this invention relates to methods for preparing phenol-formaldehyde binders using the modified phenol-formaldehyde resole resins and the resulting binder compositions. The methods include mixing the modified phenol-formaldehyde resole resins described above and a latent acid catalyst, to thereby form a liquid mixture producing a phenol-formaldehyde binder. The latent acid catalyst preferably is added in an amount such that the liquid mixture contains 0.1–20% latent acid catalyst by weight, based on a total weight of the binder solids (i.e., the weight of solids in the binder composition), and preferably from 2–20% by weight. Suitable latent acid catalysts include ammonium salts of strong acids (e.g., acids having a pH value of 2 or less). Specific examples of suitable latent acid catalysts include at least one member selected from the group consisting of an ammonium salt of sulfuric acid, an ammonium salt of oxalic acid, an ammonium salt of methanesulfonic acid, an ammonium salt of toluene-sulfonic acid, and an ammonium salt of phenolsulfonic acid.

In another aspect of this invention, the phenol-formaldehyde binders described above are applied to a fiberglass base material. After this step, the binder may be dried on the fiberglass base material and, optionally, stored for an extended time period (e.g., stored for one day, one week, one month, two months, or more). After the binder is applied to the fiberglass base material, the fiberglass material can be shaped into a desired final shape and cured. If desired, the shaping and/or curing steps can occur after the binder is applied to the fiberglass material and the combination stored for an extended time period. The shaping and curing steps also may occur simultaneously, e.g., when the binder-containing fiberglass material is shaped and cured in a mold. This invention also relates to the fiberglass products produced including the phenol-formaldehyde binders according to the invention.

In one embodiment of the invention, the first formaldehyde scavenger is melamine and the second formaldehyde scavenger is urea. In this embodiment, the molar ratio of free formaldehyde in the resole resin reaction mixture to a total amount of melamine combined with this reaction mixture is in the range of 0.1 to 30, preferably 3 to 30 and 4.5 to 7.5. The molar ratio of free formaldehyde in the resole resin reaction mixture to a total amount of urea combined with this reaction mixture in this embodiment is in the range of 0.1 to 20, preferably 2 to 20 and 0.1 to 6. The molar ratio of the total amount of melamine to the total amount of urea combined with the resole resin reaction mixture in this embodiment is 0.1 to 13.5, preferably 0.1 to 10, and advantageously 0.25 to 2.

DETAILED DESCRIPTION OF THE INVENTION

As described above, this invention relates to water soluble, storage stable, low molecular weight, amine-modified resins/binders (e.g., phenol-formaldehyde resole resins and binders made therefrom) that can be used in the production of low odor fiberglass products, such as fiberglass insulation (e.g., automobile headliners and room dividers). The following provides a general overview of the invention. The specification includes detailed examples that illustrate products and processes according to the invention.

Fiberglass insulation products according to the invention generally are prepared as follows. First, a low molecular weight modified phenol-formaldehyde resole resin material is produced. This is accomplished by modifying a resole resin to include two different formaldehyde scavengers in its structure, such as melamine and urea. The modified resole resin is then used as a starting material to produce a binder by mixing the resin with water, optionally in the presence of a latent acid catalyst, such as an ammonium salt of a strong acid. The binder can then be applied to a fiberglass base material (e.g., by spraying). After the binder is dried on the fiberglass base material, the resulting fiberglass product can be stored for an extended time period (e.g., several hours to two months or more), after which time the fiberglass product can be shaped into a desired final shape (if necessary) and the binder cured. If desired, the shaping step can occur before or during the storage and/or drying steps and/or during the curing step.

The following describes various aspects of production processes according to the invention in more detail.

I. The Phenol-Formaldehyde Resole Resin

Phenol-formaldehyde resole resins according to this invention are prepared by reacting phenol and formaldehyde in water in the presence of a basic catalyst. Examples of suitable basic catalysts include one or more members selected from the group consisting of: oxides of alkali metals, hydroxides of alkali metals, oxides of alkaline earth metals, hydroxides of alkaline earth metals, and tertiary amines. Specific examples of suitable basic catalysts include: sodium hydroxide, potassium hydroxide, calcium hydroxide, and trimethylamine. The basic catalyst may be present in any suitable amount, provided that the desired phenol/formaldehyde reaction process proceeds in a suitable manner. For example, the molar ratio of catalyst to phenol in the reaction mixture may be in the range of 0.05 to 1.0, and preferably 0.05 to 0.25.

This initial phenol-formaldehyde methylolation/ condensation step can proceed at any suitable reaction temperature over any suitable reaction time period. For example, the temperature may be in the range from 50–70° C., and preferably 55–65° C., and the reaction generally is allowed to proceed until the free formaldehyde content is in the desired range. As an example, this reaction can be allowed to proceed for a sufficient time such that the free formaldehyde content remains greater than 2.5% by weight (based on the weight of the reaction mixture), preferably greater than 3% by weight, and advantageously within the range of 4–6% by weight. The molar ratio of formaldehyde to phenol in this initial reaction step also can vary widely, provided a suitable phenol-formaldehyde resole resin product is produced. In order to avoid the presence of a great excess of free formaldehyde and/or free phenol, preferably the molar ratio of formaldehyde to phenol in the initial reaction mixture is in the range of 1.8–4.5, with the ranges of 2.2–2.6 and 2.45–2.6 being preferred.

The initial resole resin material is then modified to include a combination of two different formaldehyde scavengers, such as melamine and urea. Melamine and urea scavenge free formaldehyde that remains present in the resin after the initial formaldehyde/phenol reaction step. This scavenging acts to tie up the formaldehyde so that it is not later released, which improves the efficiency of the resin/binder system as opposed to leaving the free formaldehyde unreacted. Moreover, the scavenging ties up the free formaldehyde to thereby reduce the odor often associated with phenol-formaldehyde resole resin/binder systems.

While the combination of melamine and urea as the formaldehyde scavengers is described in the specific examples that follow, other suitable formaldehyde scavengers can be used, such as dicyandiamide, guanidine, and ammonium hydroxide. Melamine is more thermally stable than other amines, and this thermal stability may be quite useful in producing low odor fiberglass materials. Specifically, thermal breakdown of a formaldehyde-amine species may form trimethylamine (TMA) in the finished fiberglass product. TMA released from the product accounts for much of the "fishy" odor often associated with fiberglass insulation products. Therefore, use of thermally stable melamine as a formaldehyde scavenger may reduce thermal breakdown and the associated TMA emissions.

However, use of melamine on its own has associated disadvantages. Specifically, methylolated melamine (produced in the formaldehyde scavenging reaction) has been shown in the literature to be unstable over time. Often, methylolated melamine species form copious amounts of a white precipitate when the resin is allowed to age. Using urea along with the melamine in products according to the invention stabilizes the methylolated melamine and prevents it from precipitating. Also, because urea is less expensive than melamine, use of a combination of melamine and urea as the formaldehyde scavengers reduces the overall expense associated with the scavengers. The use of a combination of melamine and urea as the scavengers also decreases the TMA content in the finished fiberglass products (as compared to use of urea on its own), which thereby decreases TMA emissions from the finished fiberglass product.

In various processes according to the invention, it is advantageous that the molar ratio of the first formaldehyde scavenger to the second formaldehyde scavenger (i.e., the total amounts of each formaldehyde scavenger added to the reaction mixture containing the phenol-formaldehyde resole resin raw material and free formaldehyde) falls within the range of 0.075 to 13.5, preferably 0.1 to 10, and advantageously 0.25 to 2.

One advantageous feature of resole resin and binder systems according to the invention relates to the fact that the formaldehyde scavengers are incorporated directly into the resole resin. This eliminates the need to add the scavengers to the binder system at the time and location where the resin is transformed into the binder. For example, in typical resin/binder systems using urea as a free formaldehyde scavenger, a "premix" must be prepared prior to preparing the binder. This "premix" is a liquid mixture of phenolic resole resin and urea, which is generally pre-reacted for 4–16 hours so that the urea can adequately mix with and react with the free formaldehyde in the resole resin. As another example, in typical situations where melamine is used to scavenge the free formaldehyde in the resin, a resole resin/water/melamine "pre-react" mixture must be prepared and heated to dissolve the melamine (melamine has very limited solubility in water at room temperature). These typical urea or melamine "pre-react" mixtures have rather limited shelf lives. Therefore, if they are not used quickly, it may be necessary for the user to discard the "pre-react" mixtures and prepare new. Because the formaldehyde scavengers are directly incorporated into the resole resin in the products according to the invention, there is no need to make the traditional "pre-react" mixtures described above. This decreases the cost and waste in systems according to the invention as compared to certain known systems.

Another advantageous feature of resin systems according to the invention relates to the free formaldehyde content in the base resole resin prior to scavenger introduction. In the present invention, prior to introduction of the scavengers, the phenol-formaldehyde resole resin is reacted only to an extent such that the free formaldehyde content is greater than 2.5% by weight (based on the weight of the reaction mixture), preferably greater than 3% by weight, and advantageously within the range of 4–6% by weight. The free formaldehyde content and starting mole ratio of formaldehyde/phenol provide an indication of the extent to which the phenol-formaldehyde resole resin reaction has progressed. Lower free formaldehyde contents typically indicate that the resin production reaction has proceeded to a more advanced stage, resulting in a resole resin base material having an increased molecular weight. When the free formaldehyde content is higher (as in the present invention), this indicates that the resulting resole resin has a lower molecular weight (i.e., the resin producing reaction has not advanced as far). Lower molecular weight phenol-formaldehyde resole resins generally are easier for fiberglass insulation manufacturers to process and handle as compared to those having a higher molecular weight because the higher molecular weight resins tend to be stickier. This stickiness may cause the binder coated fiberglass product to stick to the equipment, particularly in the fiberglass forming chamber.

Also, lower molecular weight phenol-formaldehyde resole resins tend to have a lower tetradimer content. As described above, tetradimer production in phenol-formaldehyde resole resins can result in significant problems, such as precipitate formation in the resin or binder storage tanks and plugged spray nozzles. Decreasing the advancement of the resin producing reaction, using processes according to the invention, minimizes the tetradimer content of the resin and significantly reduces the likelihood of precipitate formation. This can help users avoid significant problems when preparing the binder and applying it to a fiberglass base material.

Another advantageous feature of resole resins according to the invention relates to their water solubility. The resins according to the invention are completely water soluble, which makes them easier to handle during production of fiberglass products. Other known systems that rely on emulsifiers are more difficult to handle. For example, if the emulsion breaks down (e.g., during production of the binder or the fiberglass products), the high molecular weight resins will coat the equipment. Additionally, the known emulsifiable resins tend to have higher molecular weights. Therefore, these materials can cause sticking problems as discussed above, even if the emulsion remains stable.

In one embodiment of the invention, the two formaldehyde scavengers are added sequentially to the phenol-formaldehyde resole resin reaction mixture (e.g., melamine first and then urea). In this process, the melamine methylolation step can occur at any suitable reaction temperature (e.g., 50–80° C., preferably 65–75° C., and advantageously 68–72° C.) and for any suitable reaction time period (e.g., 5–30 minutes, preferably 5–15 minutes). This melamine methylolation step is followed by urea methylolation. This reaction step also can proceed at any suitable reaction temperature (e.g., 30–80° C., preferably 65–75° C., and advantageously 68–72° C.) and for any suitable reaction time period (e.g., 5–30 minutes, preferably 15–25 minutes).

Any suitable amount of the formaldehyde scavengers also can be used without departing from the invention. For example, a molar ratio of the initial free formaldehyde in the resole resin reaction mixture to the total amount of the first formaldehyde scavenger may be selected to be in the range of 0.1 to 30, preferably 3 to 30, 3.5 to 7.5, 4.5 to 7.5, and 5.5 to 6.5. A molar ratio of the initial free formaldehyde in the resole resin reaction mixture to the total amount of the second formaldehyde scavenger combined with the reaction mixture may be selected to be in the range of 0.1 to 20, preferably 2 to 20, 3.5 to 8.5, and advantageously, about 4. As one specific example, melamine is suitable for use as the "first formaldehyde scavenger," and urea is suitable for use as the "second formaldehyde scavenger" in certain processes according to this invention. When urea is used as a formaldehyde scavenger, preferably the urea content is kept below a maximum of 15% by weight, based on a total weight of the resole resin reaction mixture and scavengers, and even more preferably, it constitutes less than 5% by weight of this mixture.

When using melamine as the first formaldehyde scavenger, a preferred molar ratio of initial free formaldehyde in the reaction mixture to the total amount of melamine added to the reaction mixture may be in the range of 4.5 to 7.5. The ability to use this relatively high molar ratio of free formaldehyde to melamine (as compared to the system described in U.S. Pat. No. 5,952,440) allows the melamine to be methylolated and dissolved relatively quickly and easily. This minimizes resin advancement during melamine modification, which helps maintain a low molecular weight resin (advantageous for the reasons described above). Moreover, a high free formaldehyde to melamine ratio helps assure that the melamine remains dissolved completely during resin production. This avoids the need to filter out undissolved melamine (as described in U.S. Pat. No. 5,952,440), which is time consuming, expensive, and produces a waste material that requires further handling.

Preferably, the resole resins according to the invention are modified to include an organic acid. This can be accomplished at any suitable time in the procedure. As specific examples, an organic acid or a precursor thereof may be added to the phenol-formaldehyde reaction mixture just prior to scavenger addition or along with one or more of the scavengers. Suitable organic acids include, as examples, carboxylic acids, diacids, phenolic acids, amino acids, and their precursors. Specific, non-limiting examples of suitable acids or their precursors include citric acid, maleic acid, tannic acid, lactic acid, or their precursors (e.g., maleic anhydride). Any suitable amount of the organic acid or precursor can be used without departing from the invention (e.g., 0.1 to 15% by weight, preferably 0.1 to 10%, based on the weight of the phenol-formaldehyde reaction mixture). In the specific examples provided below, sufficient organic acid was used to adjust the resin pH to a desired level prior to scavenger addition.

Modifying the resoles with an organic acid can dramatically increase the stability of the resins, for example, by significantly reducing tetradimer content in the resins. Thus, inclusion of an organic acid, such as maleic acid (or their precursors, such as maleic anhydride) in the resole resin can reduce and/or eliminate the disadvantages associated with tetradimer formation. Moreover, inclusion of organic acids does not contribute to TMA odors and may increase binder cure speed.

The final properties of resins according to the invention also can vary widely, depending at least in part on the process and materials used in making it. For example, the pH of the resin may be in the range of 7.5 to 10, and preferably within the range of 8 to 9. The final free formaldehyde content of the resin, after the scavengers have acted, may be less than 3% by weight, based on the total weight of the resin, and preferably less than 2%, 1.5%, or even less than 1.2% or 1% by weight. The free phenol content of the final resin product may be less than 5% by weight, based on the total weight of the resin product, preferably in the range of 2–3%. Also, resins produced by the processes according to the invention preferably include 30–70% non-volatiles, preferably 40–60%, based on the total weight of the resin. Preferably the final resin product will have a tetradimer content of less than 15% by weight, based on a total weight of the final modified resole resin product, and more preferably, less than 10% by weight.

As mentioned above, preferably resins according to the invention have a relatively low molecular weight. The GPC (gel permeation chromatography) molecular weight numbers of resins according to this invention may fall within the following ranges:

| | GPC Numbers | |
|---|---|---|
| Molecular Wt. | General | Preferred |
| Mn | <600 | <350 |
| Mw | <800 | <450 |
| Mz | <1000 | <550 |

II. The Binder

Binders according to the invention may be prepared by mixing the modified phenol-formaldehyde resole resins described above with water. Optionally, the resin and water mixture further includes a latent acid catalyst and a base (e.g., ammonium hydroxide). Suitable latent acid catalysts include ammonium salts of strong acids, e.g., acids having a pH value of 2 or less. Specific examples of suitable latent acid catalysts include at least one member selected from the group consisting of an ammonium salt of sulfuric acid, an ammonium salt of oxalic acid, and an ammonium salt of various sulfonic acids, such as methanesulfonic acid and phenolsulfonic acid. Ammonium sulfate and the various latent acid components described in U.S. Pat. No. 5,952,440 are suitable for use in producing the binders of the invention.

The amount of latent acid catalyst used, if desired, is appropriately selected so that the pH of the final binder, after curing, is less than 6. For example, the reaction mixture may include 0.1–20%, preferably 2–20%, latent acid catalyst, based on the total weight of the binder solids. In general, it is desirable to minimize the amount of latent acid catalyst used in the procedure, while still allowing the reaction to proceed in a suitable manner. This is because the latent acid catalysts are generally expensive, and large amounts of latent acid catalyst may increase the moisture adsorption characteristics of the finished fiberglass products. Additionally, ammonium based latent acid catalysts decrease the binder pH by releasing ammonia when the binder is cured. The higher the latent acid catalyst content, the higher the ammonia emissions. Reducing such emissions is desirable for operator health and general environmental reasons. In general, modifying the resins with an organic acid (such as maleic acid) or its precursor (such as maleic anhydride), as described above, can help reduce the amount of latent acid catalyst used in the binder production process.

Use of the latent acid catalysts in binder systems according to the invention may make these binder systems advantageous over various known binders. Several known binders are acidic. An acidic binder is very corrosive. In order to handle this type of binder, fiberglass insulation manufacturers must use stainless steel for any equipment that directly contacts the binder. Stainless steel has not traditionally been used in fiberglass plants; therefore, plants that desire to use acidic binders must be retrofit with stainless steel equipment. Such fitting can be expensive and time consuming. In contrast, binders according to this invention that use the latent acid catalysts are mildly alkaline. This feature minimizes the binder's corrosivity and eliminates the need to use stainless steel for all equipment that contacts the binder.

Additionally, acidic binders typically are much less stable than alkaline binders. For example, acidic binders tend to lose their water dilutability and precipitate more readily as compared to the latent acid catalyzed alkaline binders of the invention.

Binders according to the invention may include other suitable ingredients, such as those typically found in fiberglass binder systems. Examples of other suitable ingredients include silane, lignin, dedusting oils, carbon black, etc. These ingredients can be readily incorporated into binder systems according to the invention, in suitable amounts, by the skilled artisan through the exercise of routine experimentation.

If desired, it is not necessary to use any latent acid catalyst while producing binders according to the invention. In this event, the binder is prepared using water and optionally other suitable or desired binder ingredients. The resulting binder is more basic than it would be if prepared using a latent acid catalyst.

III. The Fiberglass Products

The binders according to the invention may be used in the production of fiberglass products in any suitable manner known in the art. Typically, the binder is applied to the fiberglass (e.g., by spraying, impregnating, etc.) as the fibers are being prepared, as in the manner described in U.S. Pat. No. 5,952,440. Once applied to the fiberglass, the binder is dried (also called "b-staged") to reduce the amount of water present in the product at that time. Drying may be accomplished in any suitable manner, for example, by exposing the fiberglass product to a heat source at a temperature and for a time sufficient to remove the water from the binder but insufficient to fully cure the binder on the fiberglass. Alternatively, if appropriate, drying can occur without external heating by exposing the fiberglass product to ambient conditions or moving air for a sufficient time period.

If desired, the b-staged product can be stored, during which time it can be shipped or transported to another location (e.g., the location where it will eventually be used or incorporated into another product). In its uncured state, the b-staged product can be stored for at least one day, preferably at least one week, and advantageously, for at least one month or at least two months or more.

After this optional storage period, the fiberglass product can be further shaped and sized to a desired final shape and size (if necessary). Of course, the fiberglass base material can be formed into the desired final shape and size prior to binder application, if desired, or shaping and sizing can take place before the binder is dried and/or before the binder-coated fiberglass material is stored and/or while the binder-coated fiberglass material is being cured. In this specification, the terms "shaped," "shaping," and "shape" are used generally and generically to include any suitable activities that transform the fiberglass material into a desired size and shape configuration, such as cutting, bending, molding, or the like.

Once in the desired final shape or placed in a mold for shaping, the binder-coated fiberglass material is cured under suitable curing conditions for the binder (converting the binder from b-stage to c-stage). Typically, in the binders according to the invention, curing may occur at 150–300° C. for a suitable time period, e.g., 0.5 minutes to 1 hour, preferably less than 10 minutes, and advantageously less than 2 minutes. Curing a binder on a fiberglass product of this type is conventional and well known to those of ordinary skill in the art. Appropriate molding and/or curing conditions can be readily determined by the skilled artisan using routine experimentation.

Advantageously, the trimethylamine content of the finished, cured fiberglass products according to the invention will be as low as possible, to help minimize TMA released from the product after final product installation and the resulting odor (TMA emissions from fiberglass products are often associated with a "fishy" smell). Preferably, when used in producing fiberglass insulation, the finished fiberglass product will release less than 25 ppm TMA when cured for one minute at 525° F. (274° C.) or less than 15 ppm when cured for ten minutes at 450° F. (232° C.) (preferably less than 10 ppm when cured for ten minutes at 450° F.). The procedure for making the TMA emission measurements is described in more detail in the specific examples below.

IV. EXAMPLES

The invention will now be described in conjunction with various specific examples. These examples should be construed as illustrating the invention, not as limiting it.

Example 1

A. Preparation of a Modified Phenol-Formaldehyde Resole Resin

A modified phenol-formaldehyde resole resin was prepared using the procedure described below. The following table indicates the various starting materials used in this procedure and their relative amounts:

TABLE 1

| Raw Material | Concentration | Overall Weight Percent |
| --- | --- | --- |
| Phenol | 100% | 30.60% |
| Formaldehyde | 50% (in water) | 50.85% |
| Sodium Hydroxide | 50% (in water) | 3.90% |
| Water | 100% | 7.77% |
| Maleic Anhydride | 30% (in water) | 1.76% |
| Melamine | 100% | 2.99% |
| Urea | 100% | 2.13% |
| Total | | 100.00% |

A reactor was loaded with phenol, formaldehyde, and water, in the proportions described in Table 1, and the resulting mixture was heated to 55° C. Sodium hydroxide was added over a 60 minute time period at 55° C. The resulting mixture was then heated to 66° C. over 15 minutes and held at 66° C. for 45 minutes. At that time, the mixture was allowed to cool to 55° C. and held at that temperature until the projected percent free formaldehyde content of the resulting reaction mixture was about 4.5% by weight (based on the total weight of the mixture). The reaction mixture at this stage in the process contained a phenol-formaldehyde reaction product, free formaldehyde, and free phenol.

Once the projected percent free formaldehyde content reached the desired 4.5% level, the pH of the reaction mixture was adjusted to 8.35 using 30% maleic anhydride. The resulting mixture was then heated to 70° C., at which time melamine was loaded into the reactor. This melamine containing mixture was held at 70° C. for 10 minutes, at which time the melamine was fully dissolved. Urea was then loaded into the reactor, and the resulting mixture was held at 70° C. for 20 minutes. After this time period, the reaction mixture was allowed to cool to 25° C. The mixture contained a melamine and urea modified phenol-formaldehyde resole resin.

The resulting modified phenol-formaldehyde resole resin had a molar ratio of formaldehyde to phenol of 2.60. The resulting resin also had the following properties:

TABLE 2

| Property Tested | Final Resin Property |
| --- | --- |
| % Free Formaldehyde* | 0.77% |
| % Free Phenol* | 1.47% |
| pH | 8.47 |
| % Non-Volatiles* | 54.99% |
| Water Dilutability | >50:1 |
| Acid Dilutability | >25:1 |
| % Tetradimer* | 11.4% |
| GPC Mn | 326 |
| GPC Mw | 421 |
| GPC Mz | 523 |

*Percentage, by weight, based on the total weight of the modified phenol-formaldehyde resole resin.

B. Preparation of a Binder

A binder was prepared by mixing 727.4 g of the modified phenol-formaldehyde resole resin prepared above with 1527.07 g water, 388 g of 20% ammonium sulfate (dissolved in water, a latent acid catalyst), and 14 g ammonium hydroxide (28% solution in water). After thorough mixing, a binder including the modified phenol-formaldehyde resole resin according to the invention was completed.

C. Preparation of a Fiberglass Product

The binder prepared above was applied to an unbonded 1 inch B-010 fiberglass base material by drawing a fine binder mist through the fiberglass using suction until approximately 4–5 grams of the binder had been applied to the fiberglass base material. The binder-containing fiberglass base material was then cured at 450° F. in a steel mold set to ½ inch thickness for 1 minute.

D. Testing the Fiberglass Product

The cured fiberglass material described above was cut into smaller sections sized approximately 1 inch×1 inch×½ inch. 12 grams of these small sections were weighed into cheesecloth to thereby produce two different samples having 12 grams each. For each of these samples, 10 grams of distilled water was placed in a 1-quart mason jar containing a 50 ml glass beaker. One 12 gram sample of the small fiberglass sections was set on top of the 50 ml glass beaker in each of the mason jars. The mason jars were sealed and incubated in a forced air oven for 16 hours at 65° F. The mason jars were then removed from the oven and allowed to cool to room temperature. The water in each jar was transferred to a separate scintillation vial and analyzed for trimethylamine content using a gas chromatograph-mass spectrometer. In this analysis, one water sample contained 9 ppm trimethylamine and the other water sample contained 12 ppm trimethylamine (average TMA content per sample: 10.5 ppm).

Example 2

A. Preparation of a Modified Phenol-Formaldehyde Resole Resin

A modified phenol-formaldehyde resole resin was prepared using the procedure described below. The following table indicates the various starting materials used in this procedure and their relative amounts:

TABLE 3

| Raw Material | Concentration | Weight Percent |
| --- | --- | --- |
| Phenol | 100% | 32.98% |
| Formaldehyde | 50% (in water) | 50.50% |
| Sodium Hydroxide | 50% (in water) | 4.21% |
| Water | 100% | 0.33% |
| Maleic Anhydride | 30% (in water) | 6.86% |
| Melamine | 100% | 2.99% |
| Urea | 100% | 2.13% |
| Total | | 100.00% |

A reactor was loaded with phenol, formaldehyde, and water in the proportions described in Table 3, and the resulting mixture was heated to 55° C. Sodium hydroxide was added over a 60 minute time period at 55° C. The resulting mixture was then heated to 66° C. over 15 minutes and held at 66° C. for 45 minutes. At that time, the mixture was allowed to cool to 55° C. and held at that temperature until the projected percent free formaldehyde content of the resulting reaction mixture was about 4.5% by weight (based on the total weight of the mixture). The reaction mixture at this stage in the process contained a phenol-formaldehyde reaction product, free formaldehyde, and free phenol.

Once the projected percent free formaldehyde content reached the desired 4.5% level, the pH of the reaction mixture was adjusted to 8.35 using 30% maleic anhydride. The resulting mixture was then heated to 70° C., at which time melamine was loaded into the reactor. This melamine containing mixture was held at 70° C. for 10 minutes, at which time the melamine was fully dissolved. Urea was then loaded into the reactor, and the resulting mixture was held at 70° C. for 20 minutes. After this time period, the reaction mixture was allowed to cool to 25° C. The mixture contained a melamine and urea modified phenol-formaldehyde resole resin.

The resulting modified phenol-formaldehyde resole resin had a molar ratio of formaldehyde to phenol of 2.4. The resulting resin also had the following properties:

TABLE 4

| Property Tested | Final Resin Property |
| --- | --- |
| % Free Formaldehyde* | 0.90% |
| % Free Phenol* | 2.75% |
| pH | 8.55 |
| % Non-Volatiles* | 54.23% |
| Water Dilutability | >50:1 |
| Acid Dilutability | >25:1 |
| % Tetradimer* | 6.5% |
| GPC Mn | 284 |
| GPC Mw | 362 |
| GPC Mz | 453 |

*Percentage, by weight, based on the total weight of the modified phenol-formaldehyde resole resin.

B. Preparation of a Binder

A binder was prepared by mixing 737.6 g of the modified phenol-formaldehyde resole resin prepared in Example 2A above with 1527.07 g water, 388 g of 20% ammonium sulfate (dissolved in water), and 14 g ammonium hydroxide (28% solution in water). After thorough mixing, a binder including the modified phenol-formaldehyde resole resin according to the invention was completed.

C. Preparation of a Fiberglass Product

The binder prepared in Example 2B above was applied to an unbonded 1 inch B-010 fiberglass base material by drawing a fine binder mist through the fiberglass using suction until approximately 4–5 grams of the binder had been applied to the fiberglass base material. The binder containing fiberglass base material was then cured at 450° F. in a steel mold set to ½ inch thickness for 1 minute.

D. Testing the Fiberglass Product

The cured fiberglass material described above was cut into smaller sections sized approximately 1 inch×1 inch×½ inch. 12 grams of these small sections were weighed into cheesecloth to thereby produce two different samples having 12 grams each. For each of these samples, 10 grams of distilled water was placed in a 1-quart mason jar containing a 50 ml glass beaker. One 12 gram sample of the small fiberglass sections was set on top of the 50 ml glass beaker in each of the mason jars. The mason jars were sealed and incubated in a forced air oven for 16 hours at 65° F. The mason jars were then removed from the oven and allowed to cool to room temperature. The water in each jar was transferred to a separate scintillation vial and analyzed for trimethylamine content using a gas chromatograph-mass spectrometer. In this analysis, one water sample contained 12 ppm TMA and the other water sample contained 9 ppm TMA (average TMA content per sample: 10.5 ppm).

Unless a different meaning is clear from the context, the terms "storage," "stored," or the like, as used in this specification, relate to the time period after the binder according to the invention has been applied to the fiberglass base material and before the binder is finally cured, irrespective of other activities that may occur with respect to the binder or the fiberglass product during this time period. For example, during this "storage" time, the binder can be dried on the fiberglass product (e.g., by exposing the fiberglass product to heat or other appropriate conditions, even ambient conditions, that allow the binder to dry). As additional, non-limiting examples, during this "storage" time period, the uncured binder containing fiberglass product can be moved, shipped, or transported to another location; housed in a warehouse or other storage facility; cut or otherwise shaped; attached to another base or substrate material; etc.

In this specification and the appended claims, the formaldehyde scavengers are described as "first" and "second" scavengers. These terms should not be construed as requiring a specific temporal order for the addition of scavengers. Indeed, without departing from the invention, the two scavengers can be combined with the base resin material in any suitable manner (e.g., first scavenger before the second scavenger or second scavenger before the first scavenger or concurrently). Additionally, if desired, the two scavengers can be mixed together prior to combining them with the reaction mixture without departing from the invention. Also, if desired, portions of each scavenger can be added to the reaction mixture at different times. Unless otherwise clear from the context, the terms "first" and "second" scavengers as used in this specification should be generally construed as meaning two different scavenger compositions, with no limitation on the timing or manner of addition of the scavengers to the reaction mixture.

While the invention has been described in terms of specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:

combining phenol, formaldehyde, water, and a base catalyst to form a mixture;

reacting the mixture to produce a reaction mixture containing at least a phenol-formaldehyde reaction product and free formaldehyde, wherein the reaction mixture contains more than 2.5% free formaldehyde by weight, based on a total weight of the reaction mixture;

combining a first formaldehyde scavenger and the reaction mixture, wherein the first formaldehyde scavenger includes a member selected from the group consisting of melamine, urea, guanidine, and ammonium hydroxide, and wherein a total amount of the first formaldehyde scavenger and the reaction mixture are combined such that a molar ratio or the free formaldehyde in the reaction mixture to the total amount of the first formaldehyde scavenger is in a range of 0.1 to 30;

combining a second formaldehyde scavenger and the reaction mixture, wherein the second formaldehyde scavenger is different from the first formaldehyde scavenger, wherein the second formaldehyde scavenger includes a member selected from the group consisting of melamine, urea, guanidine, and ammonium hydroxide, wherein a total amount of the second formaldehyde scavenger and the reaction mixture are combined such that a molar ratio of the total amount of the first formaldehyde scavenger to the total amount of the second formaldehyde scavenger is in a range of 0.075 to 13.5, and wherein a molar ratio free formaldehyde in the reaction mixture to the total amount of the second formaldehyde scavenger is in a range of 0.1 to 20; and reacting the reaction mixture, the first formaldehyde scavenger, and the second formaldehyde scavenger to form a modified phenol-formaldehyde resole resin, wherein the first and second formaldehyde scavengers react with at least some of the free formaldehyde in the reaction mixture, and wherein the modified phenol-formaldehyde resole resin has a free formaldehyde content of less than 3% by weight, based on a total weight of the modified phenol-formaldehyde resole resin.

2. A method according to claim 1, wherein the free formaldehyde content of the modified phenol-formaldehyde resole resin is less than 1.2% by weight, based on the total weight of the modified phenol-formaldehyde resole resin.

3. A method according to claim 1, further comprising:
adding an organic acid or a precursor thereof to the reaction mixture.

4. A method according to claim 1, wherein at least a portion of the first formaldehyde scavenger and at least a portion of the second formaldehyde scavenger are combined with the reaction mixture at the same time.

5. An infinitely water-soluble, modified phenol-formaldehyde resole resin produced by the method of claim 1.

6. A method according to claim 1, further comprising:
mixing the modified phenol-formaldehyde resole resin and a latent acid catalyst, wherein the latent acid catalyst includes at least one member selected from the group consisting of an ammonium salt of sulfuric acid, an ammonium salt of oxalic acid, an ammonium salt of methanesulfonic acid, an ammonium salt of toluenesulfonic acid, and an ammonium salt of phenolsulfonic acid, to thereby form a liquid mixture including a phenol-formaldehyde binder, wherein the latent acid catalyst is added in an amount such that the liquid mixture contains 0.1–20% latent acid catalyst, based on a total weight of binder solids.

7. A method according to claim 6, wherein the latent acid catalyst includes ammonium sulfate.

8. A phenol-formaldehyde binder prepared by the method of claim 6.

9. A method according to claim 6, further comprising:
applying the phenol-formaldehyde binder to a fiberglass base material.

10. A fiberglass product prepared by the method of claim 9.

11. A method according to claim 9, further comprising:
drying the phenol-formaldehyde binder on the fiberglass base material.

12. A method according to claim 11, further comprising:
after drying, curing the phenol-formaldehyde binder on the fiberglass base material.

13. A method according to claim 12, further comprising:
shaping the fiberglass base material to a desired final shape during curing.

14. A fiberglass product made by the method of claim 12.

15. A method according to claim 11, further comprising:
after drying, storing the fiberglass base material for a time period of at least one month.

16. A method according to claim 15, further comprising:
after storing, curing the phenol-formaldehyde binder on the fiberglass base material.

17. A method according to claim 16, further comprising:
shaping the fiberglass base material to a desired final shape during curing.

18. A fiberglass product made by the method of claim 16.

19. A method according to claim 11, further comprising:
after drying, storing the fiberglass base material for a time period of at least two months.

20. A method according to claim 19, further comprising:
after storing, curing the phenol-formaldehyde binder on the fiberglass base material.

21. A method according to claim 20, further comprising:
shaping the fiberglass base material to a desired final shape during curing.

22. A fiberglass product made by the method of claim 20.

23. A method according to claim 1, further comprising:
mixing the modified phenol-formaldehyde resole resin with water to thereby form a liquid mixture including a phenol-formaldehyde binder.

24. A phenol-formaldehyde binder prepared by the method of claim 23.

25. A method comprising:

combining phenol, formaldehyde, water, and a base catalyst selected from the group consisting of oxides of alkali metals, hydroxides of alkali metals, oxides of alkaline earth metals, hydroxides of alkaline earth metals, tertiary amines, and mixtures thereof, to from a mixture, wherein the formaldehyde and phenol are combined in amounts such that a molar ratio of formaldehyde to phenol combined into the mixture is in a range of 1.8 to 4.5;

reacting the mixture to produce a reaction mixture containing at least a phenol-formaldehyde reaction product and free formaldehyde, wherein the reaction mixture contains more than 2.5% free formaldehyde by weight, based on a total weight of the reaction mixture;

combining melamine and the reaction mixture, wherein a total amount of melamine and the reaction mixture are combined such that a molar ratio of the free formaldehyde in the reaction mixture to the total amount of melamine is in a range of 4.5 to 7.5;

combining urea and the reaction mixture, wherein a total amount of urea and the reaction mixture are combined such that a molar ratio of the total amount of melamine to the total amount of urea is in a range of 0.1 to 13.5, and wherein a molar ratio of the free formaldehyde in the reaction mixture to the total amount of urea is in a range of 0.1 to 6; and reacting the reaction mixture, melamine, and urea to form an infinitely water-soluble, modified phenol-formaldehyde resole resin, wherein the melamine and urea react with at least some of the free formaldehyde in the reaction mixture, and wherein the modified phenol-formaldehyde resole resin has a free formaldehyde content of less than 3% by weight, based on a total weight of the modified phenol-formaldehyde resole resin.

26. A method according to claim 25, wherein the free formaldehyde content of the modified phenol-formaldehyde resole resin is less than 1.2% by weight, based on the total weight of the modified phenol-formaldehyde resole resin.

27. A method according to claim 25, further comprising:
adding an organic acid or a precursor thereof to the reaction mixture, wherein the organic acid or precursor thereof is selected from the group consisting of maleic acid, citric acid, tannic acid, lactic acid, and maleic anhydride.

28. A method according to claim 25, wherein at least a portion of the melamine and at least a portion of the urea are combined with the reaction mixture at the same time.

29. A method according to claim 25, wherein the molar ratio of the total amount of melamine to the total amount of urea is in a range of 0.25 to 2.

30. An infinitely water-soluble, modified phenol-formaldehyde resole resin produced by the method of claim 25.

31. A method according to claim 25, further comprising:
mixing the modified phenol-formaldehyde resole resin and a latent acid catalyst, wherein the latent acid catalyst includes at least one member selected from the group consisting of an ammonium salt of sulfuric acid, an ammonium salt of oxalic acid, an ammonium salt of methanesulfonic acid, an ammonium salt of toluenesulfonic acid, and an ammonium salt of phenolsulfonic acid, to thereby form a liquid mixture including a phenol-formaldehyde binder, wherein the latent acid catalyst is added in an amount such that the liquid mixture contains 0.1–20% latent acid catalyst, based on a total weight of binder solids.

32. A method according to claim 31, wherein the latent acid catalyst includes ammonium sulfate.

33. A phenol-formaldehyde binder prepared by the method of claim 31.

34. A method according to claim 31, further comprising:
applying the phenol-formaldehyde binder to a fiberglass base material.

35. A fiberglass product prepared by the method of claim 34.

36. A method according to claim 34, further comprising:
drying the phenol-formaldehyde binder on the fiberglass base material.

37. A method according to claim 36, further comprising:
after drying, curing the phenol-formaldehyde binder on the fiberglass base material.

38. A method according to claim 37, further comprising:
shaping the fiberglass base material to a desired final shape during curing.

39. A fiberglass product made by the method of claim 37.

40. A method according to claim 36, further comprising:
after drying, storing the fiberglass base material for a time period of at least one month.

41. A method according to claim 40, further comprising:
after storing, curing the phenol-formaldehyde binder on the fiberglass base material.

42. A method according to claim 41, further comprising:
shaping the fiberglass base material to a desired final shape during curing.

43. A fiberglass product made by the method of claim 41.

44. A method according to claim 36, further comprising:
after drying, storing the fiberglass base material for a time period of at least two months.

45. A method according to claim 44, further comprising:
after storing, curing the phenol-formaldehyde binder on the fiberglass base material.

46. A method according to claim 45, further comprising:
shaping the fiberglass base material to a desired final shape during curing.

47. A fiberglass product made by the method of claim 45.

48. A method according to claim 25, further comprising:
mixing the modified phenol-formaldehyde resole resin with water to thereby form a liquid mixture including a phenol-formaldehyde binder.

49. A phenol-formaldehyde binder prepared by the method of claim 48.

* * * * *

UNITED STATES PATENT AND TRADEMARK OFFICE
CERTIFICATE OF CORRECTION

PATENT NO.       : 6,706,809 B2  
APPLICATION NO.  : 09/989708  
DATED            : March 16, 2004  
INVENTOR(S)      : Kim Tutin et al.

Page 1 of 1

It is certified that error appears in the above-identified patent and that said Letters Patent is hereby corrected as shown below:

In Column 15, Claim 1, Line 16:
    Please replace "or" with --of--

In Column 15, Claim 1, Line 36:
    Please replace "a" with --an infinitely water-soluble,--

In Column 16, Claim 25, Line 56:
    Please replace "from" with --form--

Signed and Sealed this

Twenty-fourth Day of April, 2007

JON W. DUDAS  
*Director of the United States Patent and Trademark Office*